Oct. 4, 1966  D. R. MOHN ET AL  3,276,194
BERRY PICKING MACHINE
Original Filed Nov. 13, 1962  5 Sheets-Sheet 1
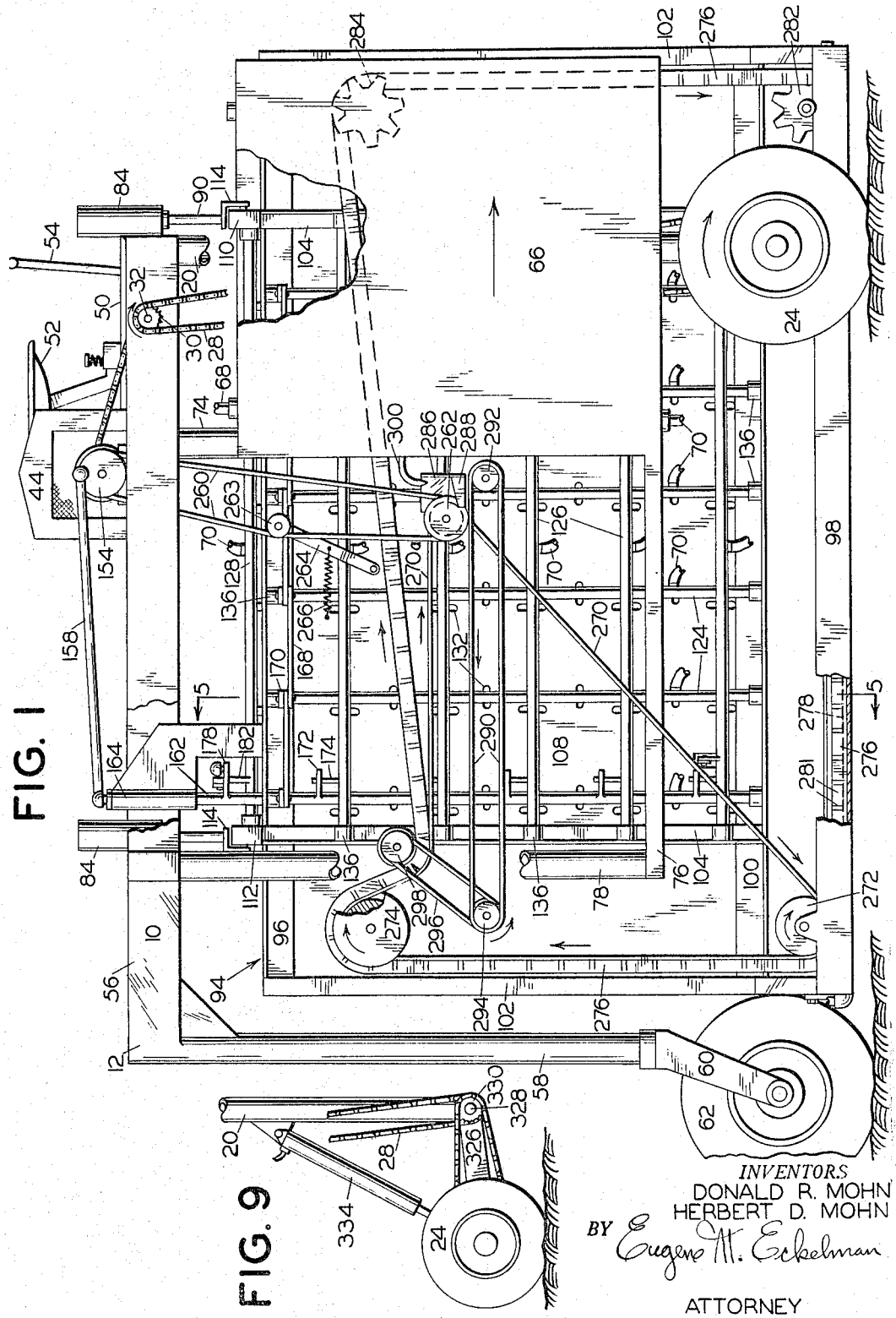
INVENTORS
DONALD R. MOHN
HERBERT D. MOHN
BY Eugene M. Eckelman
ATTORNEY Oct. 4, 1966 D. R. MOHN ET AL 3,276,194
BERRY PICKING MACHINE
Original Filed Nov. 13, 1962 5 Sheets-Sheet 2
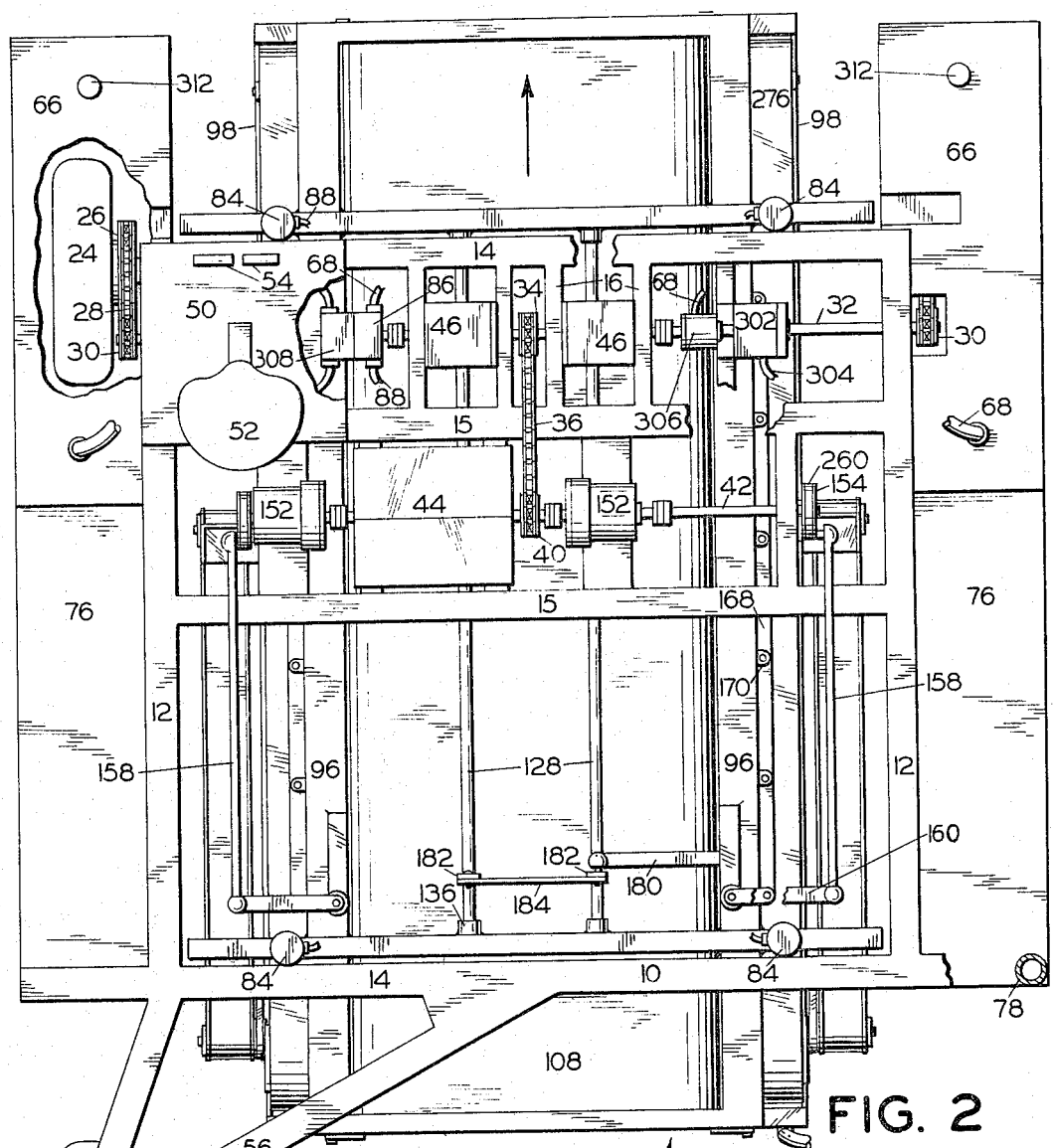
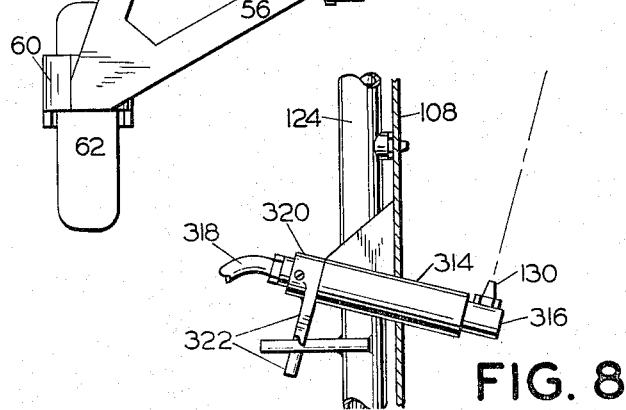
INVENTORS
DONALD R. MOHN
HERBERT D. MOHN
BY Eugene M. Eckelman
ATTORNEY Oct. 4, 1966  D. R. MOHN ET AL  3,276,194
BERRY PICKING MACHINE
Original Filed Nov. 13, 1962  5 Sheets-Sheet 3

INVENTORS
DONALD R. MOHN
HERBERT D. MOHN
BY *Eugene M. Eckelman*
ATTORNEY

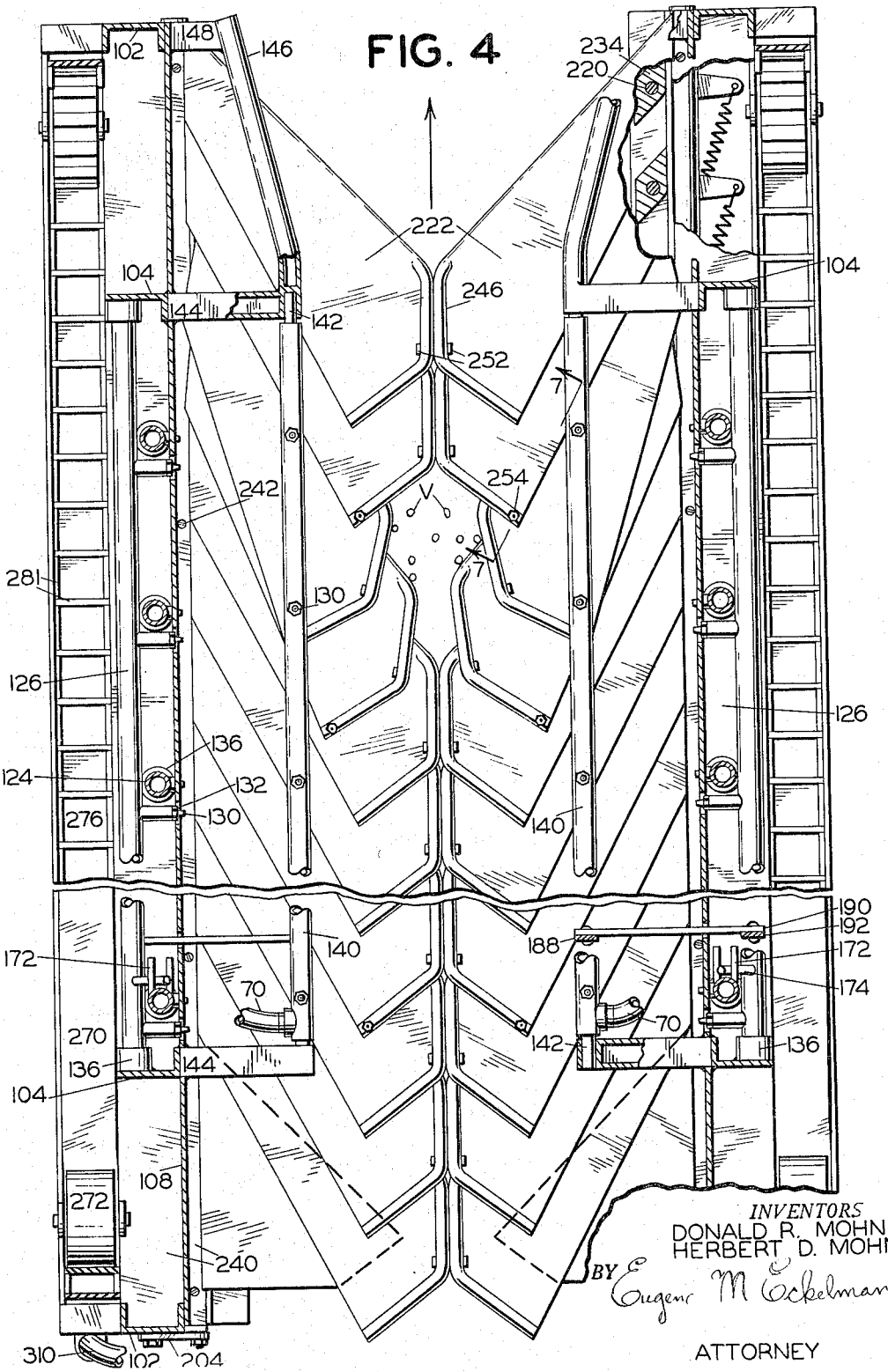

Oct. 4, 1966  D. R. MOHN ET AL  3,276,194
BERRY PICKING MACHINE

Original Filed Nov. 13, 1962  5 Sheets-Sheet 5

INVENTORS
DONALD R. MOHN
HERBERT D. MOHN
BY Eugene M. Eckelman
ATTORNEY

United States Patent Office 3,276,194
Patented Oct. 4, 1966

3,276,194
BERRY PICKING MACHINE
Donald R. Mohn, Rte. 1, Box 401, and Herbert D. Mohn, Rte. 1, Box 396, both of Troutdale, Oreg.
Continuation of application Ser. No. 236,816, Nov. 13, 1962. This application May 13, 1965, Ser. No. 458,826
16 Claims. (Cl. 56—330)

The present application comprises a continuation of application Serial No. 236,816, filed November 13, 1962, now abandoned, for Berry Picking Machine.

This invention relates to new and useful berry picking machines.

A primary objective of the present invention is to provide a berry picking machine which employs fluid jet means for removing the fruit from the vines.

Another object is to provide a berry picking machine employing a novel arrangement of fluid jets for removing fruit from vines and a novel operation thereof.

Another object is to provide a berry picking machine employing an elevated frame and a berry removing and catching mechanism suspended therefrom, and also employing means providing for vertical and lateral adjustment of the berry removing and catching mechanism relative to the elevated frame.

Another object is to provide a machine of the type described having novel berry catching mechanism, and more particularly a berry catching mechanism which is movable from its operative position to a raised position to facilitate maintenance and repair; which employs fluid jet means assisting the removal of fruit therefrom; and which supports upwardly directed fluid jet means assisting other fluid jet means in the removal of fruit from the vines.

Still another object of the present invention is to provide a berry picking machine having a novel arrangement of conveyors for conveying picked fruit from a catching mechanism to a position convenient for crating.

The present berry picking machine comprises one particularly designed for the harvesting of berries which grow on upright vines, such as raspberries, black caps, blackberries, and the like. Briefly stated the machine comprises a wheeled elevated frame from which is suspended a berry removing and catching mechanism. This latter mechanism supports a plurality of manifolds which feed fluid jets mounted thereon and which are driven in oscillatory motion to apply a similar motion to said jets in a novel berry removing function. The catching portion of the mechanism is supported at the bottom thereof and employs means facilitating the travel of the machine down a row of berry vines and the collection of berries removed from the vines. Associated with the catching mechanism is a novel conveyor system which picks the fruit up from the said mechanism and conveys it upwardly to a position convenient for crating.

The invention will be better understood and additional objects will become apparent from the following specification and claims, considered together with the accompanying drawings, wherein the numerals of reference indicate like parts and wherein:

FIGURE 1 is a side elevational view of the present berry picking machine, parts being broken away for clarity, taken on the line 1—1 of FIGURE 3;

FIGURE 2 is a top plan view of the machine and also having parts thereof broken away;

FIGURE 4 is an enlarged, foreshortened sectional view taken on the line 4—4 of FIGURE 3 and showing in particular the berry catching mechanism;

FIGURE 8 is an enlarged, fragmentary elevational view of a modified form of fluid jet means; and FIGURE 9 is a fragmentary elevational view in reduced scale of leveling means as associated with one of the supporting wheels of the machine.

WHEELED ELEVATED FRAME

Figure 3:
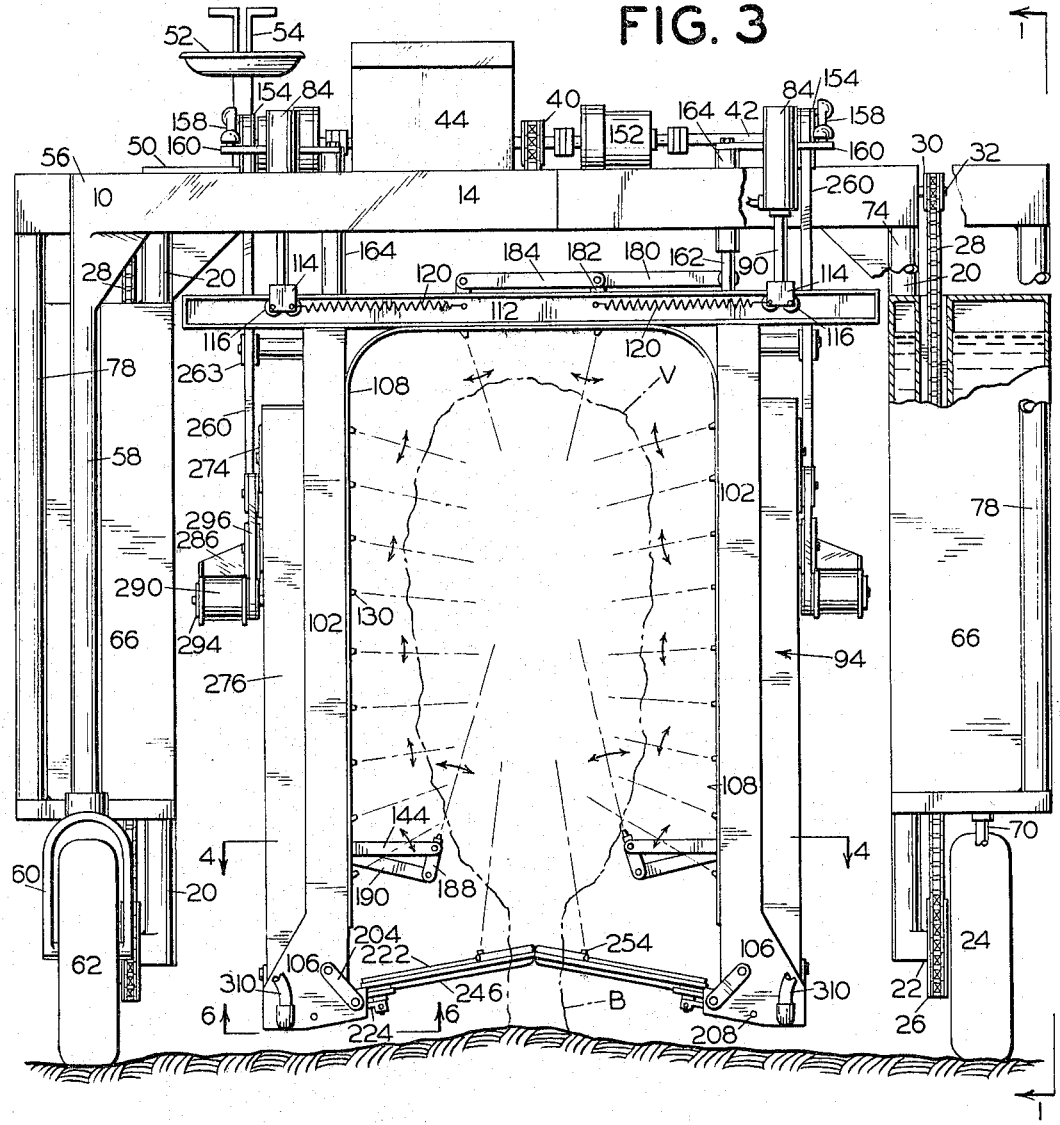
FIGURE 3 is a rear elevational view with parts broken away, taken from the left of FIGURE 1.
Figure 7:
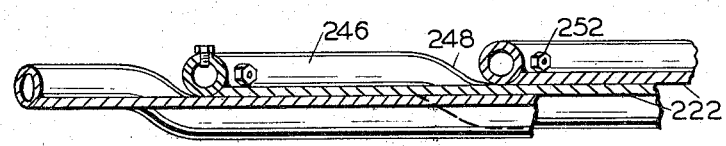
FIGURE 7 is an enlarged fragmentary sectional view taken on the line 7—7 of FIGURE 4.

Referring specifically to the drawings, and first to FIGURES 1, 2, and 3, there is employed an elevated horizontal frame 10 comprising a pair of side longitudinal frame members 12 and transverse frame members 14 at opposite ends thereof. Also employed in this elevated frame are intermediate transverse frame members 15 and auxiliary longitudinal frame members 16.

Elevated frame 10 has a three-point wheeled support and for this purpose employs a pair of front vertical posts 20, FIGURES 1 and 3. As best seen at the right in FIGURE 3, posts 20 have outwardly projecting short spindles 22 on which are rotatably mounted wheels 24. Wheels 24 have integral sprocket wheels 26, FIGURES 2 and 3, engaged by sprocket chains 28 leading upwardly to sprockets 30 keyed to a transverse shaft 32 journaled in longitudinally disposed frame members 12 and 16. Shaft 32 has a second central sprocket 34 keyed thereto and engaged by a sprocket chain 36, FIGURE 2, in turn engaged with a drive sprocket 40. Drive sprocket 40 is keyed to a drive shaft 42 also journaled in the various longitudinal frame members and leading from a source of power 44 such as a gasoline engine.

Incorporated in shaft 32 on opposite sides of sprocket 34 are a pair of variable drive units or clutches 46. As apparent, clutches 46 are in the drive assembly for the front wheels and are utilized to steer the vehicle.

Supported on the top of the elevated frame 10 is an operator's platform 50 having a seat 52 and suitable controls 54 for operation of the motor 44, the clutches 46, and various other drive units to be described hereinafter.

The rear of the overhead frame has a single wheel support through the medium of a rearwardly and laterally projecting horizontal frame assembly 56, a vertical post 58 leading downwardly from frame assembly 56, and a yoke 60 on the bottom of post 58 mounting a wheel 62. Wheel 62 is longitudinally aligned with one of the front wheels. Such three point support of the frame facilitates efficient maneuverability and operation of the apparatus on uneven ground.

Integrally supported at the sides adjacent the front of the apparatus are fluid storage tanks 66 each having an inlet conduit 68 in its top wall and an outlet conduit 70 in its bottom wall. Tanks 66 are secured to front vertical posts 20, as by welding, and also to auxiliary vertical posts 74, FIGURE 1, leading downwardly from the elevated frame. Leading rearwardly from tanks 66 adjacent the bottom thereof are horizontal platforms 76 the rearward ends of which are secured to rearwardly disposed auxiliary posts 78 depending from the elevated frame.

BERRY REMOVING AND CATCHING MECHANISM

Berry removing element

Securely mounted in vertical disposition on the elevated frame are forward and rearward pairs of fluid support cylinders 84 operated by a pump 86, FIGURE 2, incorporated in shaft 32. Conduits 88 are connected between said pump and the cylinders 84.

Cylinders 84 have downwardly projecting piston rods 90 from which is suspended the fruit removing and catching mechanism designated generally by the numeral 94.

This latter mechanism comprises a frame having a pair of side longitudinally disposed frame members 96, a pair of side lower longitudinally trough-like frame members 98, a pair of side auxiliary longitudinal frame members 100 spaced a short distance above the trough-like frame members 98, a pair of front and rear vertical frame members 102, and a pair of auxiliary frame members 104 spaced a short distance rearwardly of the vertical rearward frame members 102. Front and rear members 102 have flared bottom portions 106, FIGURE 3, and the frame members 98 are secured to these flared portions and therefore offset laterally outwardly from the other frame members of the element 94.

The frame mechanism just described is open at the bottom and ends, and the sides and top are enclosed by an inner sheet metal lining 108, FIGURE 3.

The fruit removing and catching mechanism 94 is suspended from the fluid cylinders 84 through the medium of front and rear transverse tracks 110 and 112, respectively, these track members being integrated with the upper longitudinal frame members 96. Piston rods 90 carry at their lower ends L-shaped brackets 114 supporting roller assemblies 116, FIGURE 3, engageable with the tracks 110 and 112. By this arrangement the entire fruit removing and catching mechanism 94 is adjustable laterally relative to the piston rods and to the elevated frame, for the purpose of automatically adjusting itself laterally for a purpose to be described. Tension springs 120 are connected between each of the brackets 114 and the tracks for the purpose of recentering the mechanism 94.

In addition to the lateral shifting accomplished by the roller assemblies 116 and the tracks 110, 112, it will be apparent that vertical adjustment of the mechanism 94 is accomplished through the medium of the fluid cylinders 84. Such vertical shifting is to accommodate raising and lowering according to the position desired for optimum removal of fruit and for a accommodating rough terrain which is being traversed by the apparatus.

Removal of fruit from the vines is accomplished by forceful ejection of fluid from nozzles carried on the mechanism 94, best seen in FIGURES 1, 3, 4, and 5. More particularly, there are employed a plurality of spaced vertical manifolds 124 on each side of the mechanism, a pluraliy of spaced horizontal manifolds 126 also on each side, and a pair of top, centrally located, longitudinally disposed manifolds 128, FIGURE 2. Each of the manifolds thus far described carries a plurality of nozzles 130 projecting inwardly and through slots 132, FIGURE 5, in the lining 108. Each of the manifolds 124, 126, and 128 is rotatably mounted in end journals 136 and are operated in oscillatory motion by mechanism to be described hereinafter. Also incorporated in the mechanism 94 are a pair of lower manifolds 140 which as best seen in FIGURE 4 are longitudinally disposed and spaced inwardly from the inner side walls of the mechanism 94. These latter manifolds are ratatably supported on stub shafts 142 projecting from short lateral arms 144 integrated with auxiliary vertical frame members 104. Manifolds 140 have a pluraliy of spaced, upwardly directed nozzles 130 and also serve as rub bars adapted to engage obstructions and cause lateral shifting of the mechanism 94 if necessary. Leading forwardly from the manifolds 140 are outwardly angled rub bar extensions 146, these extensions being integrated with the lateral arms 144 and short forward arms 148. The forward flared arrangement of the rub bars provides a widened mouth portion for the reception of berry vines or posts in the forward movement of the machine.

Oscillatory movement of the manifolds 124, 126, 128, and 140 in their journals is accomplished by shaft 42, this shaft having suitable clutch and gear box means 152 for controlled operation thereof on opposite sides of sprocket 40 and end drive wheels 154 keyed thereto. Eccentrically connected to the drive wheels 154 are crank shafts 158 pivotally connected to horizontal, laterally extending levers 160. These levers are secured integrally to an extension 162, FIGURE 1, of the rearwardmost vertical manifolds 124, this extension having an upper journaled support in an upright bracket 164.

In accordance with the structure thus described it will be apparent that upon rotation of drive wheels 154, canks 158 and levers 160 will oscillate the rearwardmost manifolds 124. These two rearwardmost manifolds 124 serve as oscillatory drive means for all the other manifolds by means now to be described.

Referring first to FIGURES 1 and 2, the remaining vertical manifolds 124 are connected to the drive manifold 124 by horizontal links 168 pivotally connected to outwardly projecting ears 170 integral with the manifolds. Thus, rotation of the drive manifold 124 in oscillatory motion will also apply the same motion to the other vertical manifolds.

With regard to the horizontal side manifolds 126, the drive manifolds 124 employ pairs of fingers 172 for each horizontal manifold, and these pairs of fingers receive therebetween upright pins 174 on the manifolds 126. Since the fingers 172 are in a horizontal plane and the pins 174 are in a vertical plane, it is apparent that oscillatory motion of the drive manifold 124 in its vertical plane will apply oscillatory motion to the manifolds 126 in their horizontal plane and at the same rate of speed.

With regard to the top manifolds 128, one of the extensions 162 has a longitudinally extending short lever 178, FIGURE 1, to which is pivotally connected a transverse link 180, FIGURES 2 and 3. This link is pivotally connected to an upright finger 182 integrated with the nearest manifold 128. The other manifold has a similar upright finger 182 and such fingers are pivotally connected by a transverse link 184. Thus, oscillatory motion of the extension 162 in its vertical plane will apply oscillatory motion to the manifolds 128 in their horizontal plane.

Figures 5, 6:
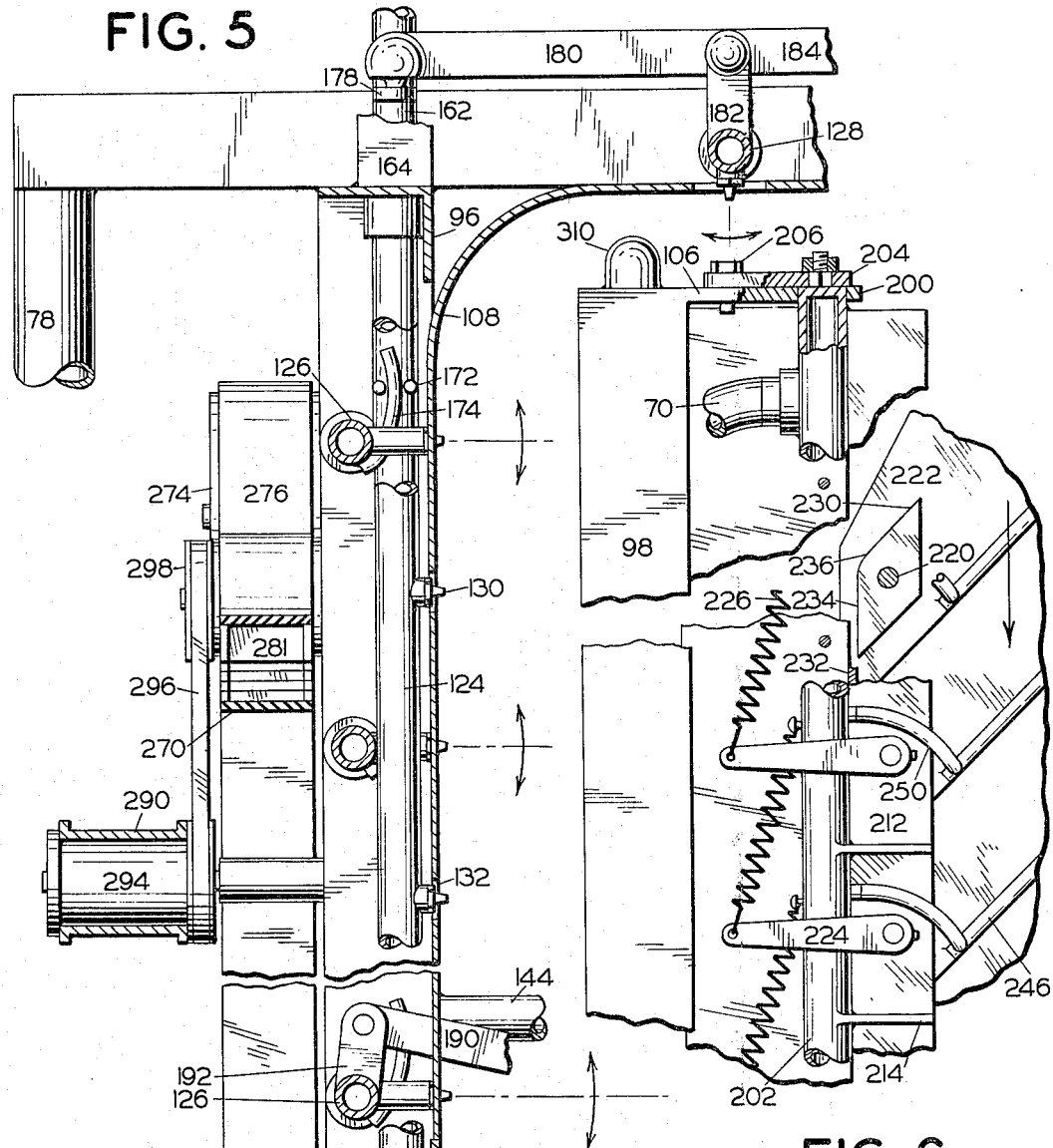
FIGURE 5 is an enlarged, foreshortened sectional view taken on the line 5—5 of FIGURE 1 and showing in detail a portion of the berry catching mechanism as well as a portion of the fluid jet means for removing the berries.
FIGURE 6 is an enlarged fragmentary bottom plan view of the berry catching mcehanism, taken on the line 6—6 of FIGURE 3.

Each of the manifolds 140 has a downwardly disposed integral lever 188, FIGURE 3, to which is pivotally connected a laterally disposed link 190, also seen in FIGURE 5. Each of the links 190 is pivotally connected to an upstanding lever 192, FIGURE 5, on the lowermost horizontally disposed manifolds 126. Thus, oscillatory motion of the manifolds 126 will in turn apply a similar motion to the manifolds 140.

The range of oscillatory motion depends upon the length of lever 160 which of course may be provided of suitable length dimension to achieve an optimum fruit removing function. The rate of oscillation may also be varied accordingly by the speed of shaft 42.

Fruit catching element

Supported at the lower end of the mechanism 94 is a fruit catching element best shown in FIGURES 3 and 4–7. Secured to each of the trough-like frame members 98 adjacent the ends thereof are inwardly projecting vertical plates 200, FIGURES 5 and 6. Journaled in these plates are longitudinally disposed manifolds 202. The forward ends of these manifolds project through plates 200, FIGURE 6, and have an integral connection with lever arms 204 lying along the outer face of plates 200. Each of the levers 204 has a removable pin 206 on its end opposite from the end which is connected to the manifolds.

Pins 206 are adapted for engagement with respective pairs of apertures 208 in said end plates, the two apertures in each of the pairs being spaced and being in concentric relation with the axis of manifold 202. The two apertures through the engagement thereby of pins 206 permit a two position location of the levers 204, one of which locates the manifold in a berry catching position, as in FIGURE 3, and the other of which locates the manifold in an upward position facilitating maintenance or repair.

Secured to each of the manifolds 202 is a longitudinally disposed support plate 212, FIGURES 5 and 6, laterally directed vertical webs 214 being integrated with the manifolds and plate 212 for reinforcement.

Secured to the under-side of plates 212 at selected intervals are bearing members 218 for shafts 220 secured at their upper end to inwardly and rearwardly projecting, overlapping berry catching leaves or plates 222 and at their lower end to outwardly projecting lever arms 224.

As best seen in FIGURE 4, the leaves 222 are of a size and shape to have an overlapping relationship whereby to catch all berries which may fall thereon. Also, as seen in FIGURE 5, the two sets of leaves are inclined downwardly toward the troughs 98 whereby the fruit will travel by gravity toward said troughs. Each of the arms 224 is connected to a tension spring 226 in turn connected to the manifold 202. These springs serve to return the leaves to rest or berry catching position.

The leaves 222 are thus rotatable relative to the support plate 212 and disposed intermediate such leaves and the plates 212 are diamond shaped bearing plates 230 which also serve as stop members for the leaves. These latter members comprise an integral part of the leaves and are associated with longitudinal ribs 232 on the plates 212 such as to stop the leaves 222 under the action of the springs 226 and maintain the leaves in their normal fruit catching position. More particularly, the stop members 230 are secured to the leaves such that one edge 234 abuts squarely against the ribs 232 in the berry catching position of the leaves to maintain the latter in such position. The shape of these stop members allows the leaves and integral bearing plates to be pivoted with the shafts 220 to open up for vines, berry posts, or the like, one corner 236 of the stop members 230 being rounded to permit such rotation.

A top closure plate 240, FIGURE 5, is removably secured to the manifolds 202 by screws 242 and serves as lateral extension means for directing fruit from the leaves 222 into the troughs 98.

When it is desired to rotate the leaf assemblies upwardly for maintenance or repair the plates 240 are first removed by taking out screws 242. As described hereinbefore, positioning of the leaf assemblies in such upper position is accomplished by the removal of pins 206 and the rotation of lever arms 204 to a point where the pins 206 can be inserted in the lowermost aperture 208.

Each of the leaves 222 incorporates fluid jet means to assist the gravity travel of the fruit into the troughs 98. For this purpose a conduit 246 is secured to the inner contoured edge of the leaves on its top surface. At the forward inner edge of each leaf, however, the conduit is bent downwardly at 248, FIGURE 7, and extends along the forward bottom edge thereof. By reason of the over and under location of the conduits 246, the leaves 222 are free to pivot relative to adjacent leaves, and with the conduits extending along the forward edge thereof a rounded vine engaging portion is provided to prevent or minimize damage to the vines.

Fluid is fed from the manifolds 202 to each of the conduits 246 by flexible hoses 250, and each conduit 246 at substantially the horizontal center of its leaf has a nozzle 252 directed outwardly and adapted to eject a wide spray along the upper surface of the leaf. Fluid ejected from the nozzles forcefully conveys the fruit into the troughs 98.

Also, conduits 246 on alternate leaves have upwardly directed nozzles 254 which due to their close positioning relative to the vines serves to remove berries at the bottom and closely adjacent the vines.

CONVEYOR SYSTEM

The present apparatus employs a conveyor system for picking up berries from the troughs 98 and depositing them in a suitable place for crating, one such conveyor system being provided on each side of the mechanism 94. More particularly, the drive wheels 154 comprise pulleys for a V-belt 260 which drives a conveyor roller 262 rotatably supported on the side of the fruit removing and catching mechanism 94. Engageable with the belt 260 is a pulley 263 on a slack take-up arm 264 pivotally mounted on the mechanism 94 and operated by a spring 266. This slack take-up mechanism maintains a positive drive connection between conveyor roller 262 and belt 260 and also allows for vertical adjustment of the mechanism 94 relative to the elevated frame.

Mounted on conveyor roller 262 is an endless flat belt 270 also mounted on a roller 272 in the trough 98 at the rear end of the apparatus and an upper roller 274 rotatably supported on the mechanism 94.

Associated with the flat drive belt 270 in the conveyor system is a fruit pick-up belt 276. Belt 276 is formed of a flat belt portion 278 and box-like compartments 280 thereon. Compartments 280 are enclosed at the sides by side walls 281 but have an open end opposite from the belt portion 278. Belt 276 is mounted on rollers 272 and 274, as well as forward lower sprocket-like roller 282 and upper sprocket-like roller 284, the roller 282 being journaled in the forward end of trough 98 and the roller 284 being journaled on the side of mechanism 94. The fruit pick-up belt thus has a lower flight through the trough 98, and at the rear of the machine passes over the roller 272 in overlying relation with the drive belt 270. Drive belt 270 being disposed on the open end of the compartments 280 closes said compartments as the fruit pick-up belt moves vertically toward roller 274. This association of the belts is maintained until the belts have moved over roller 274 wherein the fruit pick-up belt 276 is then in inverted relation and the fruit empties therefrom by gravity onto a horizontal flight 270a of drive belt 270.

Horizontal flight 270a, moving to the right in FIGURE 1, carries the fruit over the end of roller 262 and onto a laterally disposed inclined chute 286 having an upwardly projecting end wall 288 at its lower end. The chute 286 deposits the fruit on a horizontal conveyor flight 290 operating over end rollers 292 and 294. Roller 294 is engaged by a V-belt 296 operating over an upper roller 298 engageable with the belt 276 forwardly of roller 274. As apparent in FIGURE 1, roller 298 is located such as to draw the drive belt 270 and fruit pick-up belt 276 downwardly on the right side of roller 274. This establishes a positive drive for the conveyor 290 as well as providing a good friction drive between the belts 270 and 276.

Associated with the chute 286 is an air nozzle 300. This nozzle is connected to a pump 302, FIGURE 2, by a suitable conduit 304 and serves to blow away leaves which may be picked up with the berries. This air nozzle also serves to remove excess water from the fruit.

Fluid from the tanks 66 are supplied to the various manifolds 124, 126, 128, 140 and 202 by the conduits 70 from the bottom of tanks and the tanks are pressured by a pump 306, FIGURE 2, connected thereto by conduit 68 leading from the top of the tank. It is desirable to return some of the fluid from the troughs 98 to the tanks 66, and for this purpose a pump 308, FIGURE 2, has an inlet conduit 310 leading from the rearward ends of the trough 98 and an outlet conduit 312 leading to the upper portion of said tanks. Such conserves on the volume of water necessary to operate the machine without refilling the tanks.

OPERATION

In operation of the present apparatus, the operator manipulates it in straddling relation along a row of berries to be harvested. Vertical adjustment of the suspended mechanism 94 is accomplished by suitable operation of the fluid cylinders 84, such vertical positioning depending upon the type of berries to be harvested as well as the condition of the terrain to be traversed.

The spray nozzles are put in operation and through their oscillatory motion with the manifolds on which they are mounted, ripe berries are removed from the vines. By the arrangement of manifolds described, the berries are efficiently removed from the vines at the top, bottom, and inside thereof. FIGURE 3 illustrates in detail the various jet paths of fluid from the nozzles as associated with a vine V. Nozzles 254 on the leaves 222 also serve to remove berries at the bottom of the bush. It is desirable that the manifolds have rather fast oscillatory motion, for example one or two oscillations a second, since it has been found that a sudden impingement of fluid against the berries rather than a slow sweeping motion, accomplishes efficient removal of the berries.

As the apparatus moves along the vines, the leaves 222 pivot rearwardly to provide an opening therefor, as illustrated in FIGURE 4. As they move past the vines they immediately close. The leaves 222 have a similar action when moving through berry posts or other obstructions and if the machine should be misaligned with a berry post or the like the engagement of the post by the rub bars 140, 146 shifts the mechanism 94 on the rollers 116 to prevent damage to the mechanism.

The berries are conveyed from the troughs 98 to the sorting conveyor 290 and from this conveyor the fruit is crated or otherwise packaged by workers standing on the platforms 76.

FIGURE 8 illustrates vertically disposed fluid jet means which are arranged to oscillate in the direction of travel of the machine, and may be employed in lieu of the nozzles 130 on the rub bar manifolds 140 or in lieu of or in combination with the nozzles 130 on the vertical manifolds 124. For this purpose a sleeve bearing 314 is integrally secured to lining 108 and rotatably supports a conduit 316 having a nozzle on its inner end and a flexible conduit 318 on its outer end leading to a fluid supply such as the outlet 70 of one of the tanks 66. Mounted securely on the outer end of conduit 316 is a set collar 320 having a pair of spaced fingers 322 projecting downwardly therefrom in parallel relation. Secured to manifold 124 is a horizontal pin 324 projecting between the fingers 322 and adapted upon oscillating motion of manifold 124 to impart a similar motion to conduit 316 and nozzle 130 except in a different direction comprising the direction of travel of the machine.

It is desirable that the wheeled supporting frame 10 be capable of being leveled for operation on inclined terrain, and for this purpose leveling mechanism may be combined with the one front wheel 24 which is on the side opposite the two wheels 24 and 62, namely, the right side in FIGURE 2, it being understood that such leveling mechanism would be mounted at the bottom of the respective post 20 in lieu of the wheel mechanism shown in the FIGURE 1 embodiment. Such a leveling mechanism is illustrated in FIGURE 9 and comprises a longitudinally disposed wheel supporting bar 326 pivotally mounting on a transverse shaft 328 attached to the one front post 20 adjacent its bottom. Rotatably mounted on the shaft 328 is a double sprocket 330 engaged by chain 28 and a chain 332 leading to a sprocket 26 integral with wheel 24. Pivotally secured angularly between post 20 and the outer end of bar 326 is a fluid cylinder assembly 334 operated by suitable fluid pump means to position the bar 326 at a selected angular relation to the post 20 and therefore to position this side of the supporting frame a selected distance from the ground to level the frame.

It is to be understood that the invention may take other forms than that shown and that all such modifications and variations within the scope of the appended claims which will occur to persons skilled in the art are included in the invention.

Having thus described our invention, we claim:

1. A fruit harvesting machine comprising a supporting frame adapted for movement along a row of fruit bearing vines, said frame having upright, longitudinally extending side portions and also having upper and lower portions, a plurality of fluid supply nozzles mounted on said frame for oscillation for directing fluid under pressure into the vines, power operated pressure means supplying fluid to said nozzles under pressure for removing fruit from the vines, and power operated oscillating means engageable with said nozzles for oscillating the latter.

2. The fruit harvesting machine of claim 1 wherein said power operated oscillating means oscillates said fluid supply nozzles in a vertical direction.

3. The fruit harvesting machine of claim 1 wherein said power operated oscillating means oscillates said fluid supply nozzles in the direction of travel of the machine.

4. A fruit harvesting machine comprising a supporting frame adapted for movement along a row of fruit bearing vines, vertically and horizontally disposed manifold pipes on said frame, fluid nozzles on said manifold pipes arranged to direct fluid under pressure into the vines, power operated pressure means supplying fluid to said jets under pressure, and drive means to oscillate said pipes and said nozzles to produce oscillating fluid jet sprays for removing fruit from the vines.

5. A fruit harvesting machine comprising a wheeled frame adapted for straddling movement along a row of fruit bearing vines, a second frame supported on said wheeled frame, said second frame having upright longitudinally extending side portions and also having upper and lower portions, the ends and bottom of said second frame being open for receiving vines between said side walls as said machine moves along a row of the vines in straddling relation, liquid jet means mounted adjacent the sides and top of said second frame, a pair of longitudinally disposed, laterally spaced rub bars mounted on said second frame adjacent the lower portion thereof for guiding said second frame along a row of vines, and liquid jet means in said rub bars.

6. Fruit catching mechanism comprising a lower frame, a plurality of horizontally disposed overlapping plate members pivotally mounted on said lower frame, said plate members having an upper fruit catching surface, and fluid jet means on said plate members directed along said fruit catching surface thereof for forcing fruit off one side thereof.

7. The fruit catching mechanism of claim 6 including trough means adjacent the outer end of said plate members for receiving fruit forced off said members by the fluid jet means.

8. The fruit catching mechanism of claim 6 wherein each of said plate members has a forward edge and an inner end, a conduit on said forward edge and said inner end, and said fluid jet means includes a nozzle in the conduit adjacent the inner end of said conduit for forcing the fruit off the one side thereof.

9. The fruit harvesting machine of claim 1 including a wheeled frame adapted for straddling movement relative to a row of fruit bearing vines, and means suspending said supporting frame from said wheeled frame for lateral adjustable movement.

10. The fruit harvesting machine of claim 1 including a wheeled frame adapted for straddling movement relative to a row of fruit bearing vines, and means suspending said supporting frame from said wheeled frame for lateral adjustable movement and vertical adjustable movement.

11. The fruit harvesting machine of claim 4 including fruit catching means supported adjacent the bottom of said supporting frame for catching removed fruit, first conveyor means operable through said fruit catching means for receiving the fruit therefrom and carrying them upwardly to a loading area, and second conveyor means on said machine adjacent said loading area for receiving fruit from said first conveyor means.

12. The fruit harvesting machine of claim 4 including fruit catching means supported adjacent the bottom of said supporting frame for catching removed fruit, first conveyor means operable through said fruit catching means for receiving the fruit therefrom and carrying them upwardly to a loading area, said first conveyor means including a belt having fruit receiving compartments thereon, and second conveyor means on said machine adjacent said loading area for receiving fruit from said first conveyor means, said second conveyor means including a flat belt adapted to lie along said first conveyor means in selected flights of said first conveyor means to cover the compartments thereon and confine fruit in said compartments.

13. A fruit harvesting machine comprising a supporting frame adapted for movement along a row of fruit bearing vines, means on said frame for removing fruit from the vines, fruit catching means supported adjacent the bottom of said supporting frame for catching removed fruit, first conveyor means having fruit receiving compartments thereon, and second conveyor means on said machine, said first conveyor means having a lower horizontal fruit receiving portion, a vertical portion leading upwardly from said horizontal portion, and a reversely turned inverted upper portion, and said second conveyor means including a flat belt arranged to lie along said first conveyor means at its vertical portion and through a portion of its inverted upper portion for confining fruit in said compartments.

14. The fruit harvesting machine of claim 13 wherein said second conveyor means leads angularly away from said first conveyor means in the inverted upper portion of the latter whereby to receive fruit from said compartments.

15. The fruit harvesting machine of claim 13 wherein said second conveyor means leads angularly away from said first conveyor means in the inverted upper portion of the latter whereby to receive fruit from said compartments, and third conveyor means arranged to receive fruit from said second conveyor means.

16. The fruit harvesting machine of claim 13 wherein said second conveyor means leads angularly away from said first conveyor means in the inverted upper portion of the latter whereby to receive fruit from said compartments, third conveyor means arranged to receive fruit from said second conveyor means, and fluid jet means between said second and third conveyor means for blowing foreign objects from said fruit.

References Cited by the Examiner

UNITED STATES PATENTS

| 2,996,868 | 8/1961 | Voelker | 56—328 |
| 3,006,131 | 10/1961 | McDowell | 56—330 |
| 3,114,998 | 12/1963 | Weisser | 56—329 |

FOREIGN PATENTS 1,176,286  11/1958  France.

ABRAHAM G. STONE, *Primary Examiner.*

RUSSELL R. KINSEY, *Examiner.*